United States Patent
Rainbolt et al.

(10) Patent No.: US 7,050,514 B2
(45) Date of Patent: May 23, 2006

(54) INTERFERENCE ESTIMATION AND SCALING FOR EFFICIENT METRIC STORAGE AND INTERFERENCE IMMUNITY

(75) Inventors: Bradley J. Rainbolt, Sunrise, FL (US); Stephen R. Carsello, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 105 days.

(21) Appl. No.: 10/640,110

(22) Filed: Aug. 13, 2003

(65) Prior Publication Data

US 2005/0037712 A1    Feb. 17, 2005

(51) Int. Cl.
*H03D 1/00*      (2006.01)
*H04L 23/02*   (2006.01)
*H04B 15/00*   (2006.01)

(52) U.S. Cl. .................. 375/341; 375/265; 375/262; 455/63.1

(58) Field of Classification Search ........... 375/232, 375/341, 262; 455/137

See application file for complete search history.

(56) References Cited

U.S. PATENT DOCUMENTS

| | | | | |
|---|---|---|---|---|
| 5,577,068 | A * | 11/1996 | Bottomley et al. | 375/232 |
| 5,920,599 | A * | 7/1999 | Igarashi | 375/341 |
| 5,933,462 | A * | 8/1999 | Viterbi et al. | 375/341 |
| 5,995,550 | A * | 11/1999 | Xu et al. | 375/262 |
| 6,876,709 | B1 * | 4/2005 | Kim et al. | 375/341 |
| 2004/0033791 | A1 * | 2/2004 | Schmidl et al. | 455/137 |
| 2005/0025076 | A1 * | 2/2005 | Chaudhuri et al. | 370/310 |

* cited by examiner

*Primary Examiner*—Stephen Chin
*Assistant Examiner*—Linda Wong (57) ABSTRACT

A system, wireless device (402) and method receive a set of soft metrics (614) associated with a block of symbols during a predetermined time interval, use the set of soft metrics (614) to form an initial interference power estimate, form a moving-average estimate of interference power (616) corresponding to each predetermined time interval, and scale the set of soft metrics (614) according to the corresponding interference power estimate resulting in a set of scaled metrics (618). Then they limit the dynamic range of the set of scaled metrics (618), linearly quantize the limited metrics, and output the linearly quantized limited metrics (628) to a memory buffer. The size of the memory buffer containing the linearly quantized limited metrics (628) is smaller than the size of a memory buffer required to store the received soft metrics (614). The linearly quantized limited metrics (628) are then used as input to a decoder.

15 Claims, 9 Drawing Sheets

PRIOR ART

INTERFERENCE ESTIMATION AND SCALING FOR EFFICIENT METRIC STORAGE AND INTERFERENCE IMMUNITY

FIELD OF THE INVENTION

The present invention generally relates to the field of wireless communications and more particularly to interference estimation and scaling in order to provide efficient metric storage and immunity from interference.

BACKGROUND OF THE INVENTION

In many wireless communication systems that perform block processing, it is typically necessary that metrics for an entire block be stored in the receiver before demodulation/decoding procedures can be performed. This requires the storage of a substantially large set of metrics. Furthermore, if soft-decision combining is performed, it is necessary to represent each metric using several bits. In some digital signal processors, as much as a 32-bit word may be necessary for each metric if they cover a large dynamic range.

Figure 1:
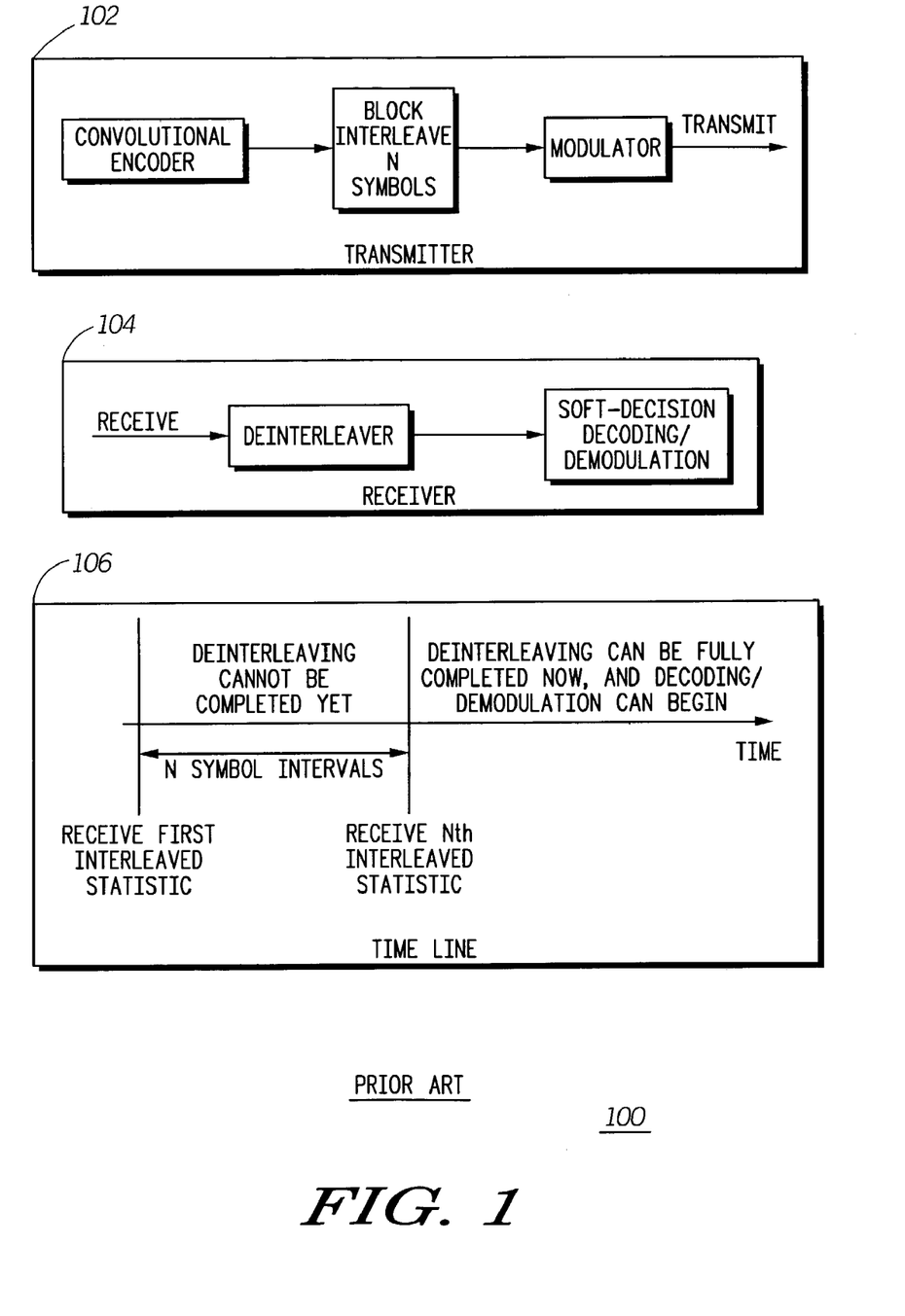
FIG. 1 is a block diagram illustrating a typical prior art process of deinterleaving for a convolutionally encoded wireless communications system.
Figure 2:
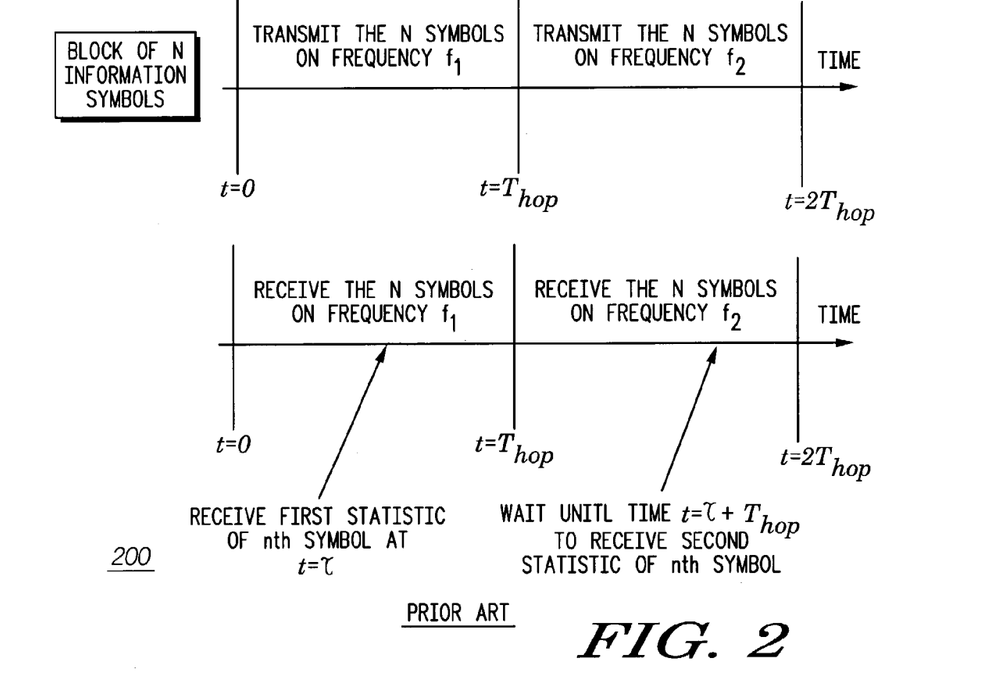
FIG. 2 is a time line illustrating the time frame for reception of a frequency-hopped signal according to a prior art implementation.

As an illustration of the problem existing in prior art, two example applications are shown in FIGS. 1 and 2. In the first example in FIG. 1, a block of N symbols out of a convolutional encoder is block-interleaved at the transmitter 102 in order to provide robustness against fading. At the receiver 104, the whole block of N symbols must be stored into memory before the de-interleaving process can be fully completed, at which time the decoding/demodulation procedure can begin, as indicated by the time line 106. If a soft-decision decoder is used, such as a Viterbi decoder, then each stored metric will comprise several bits. For large values of N, the amount of storage required could be prohibitively large.

In the second example, shown in FIG. 2, a frequency-hopped digital communication system employs diversity by transmitting a block of symbols twice, on each of two different hops. In the receiver, a symbol is demodulated by soft combining of the symbol's received statistics on each of the two hops. In the transmitter, a block of N symbols is sent during a time interval of $T_{hop}$ seconds, on two different hops. At the receiver, once the statistic from the first hop is obtained at time $t=\tau$, the receiver must store that statistic until time $t=\tau+T_{hop}$, when the statistic from the second hop is received, and soft-combining can then be performed. Thus, the entire set of N statistics received on the first hop must be stored before soft combining can be done. Again, the amount of storage required can be problematic for large values of N.

Figure 3:
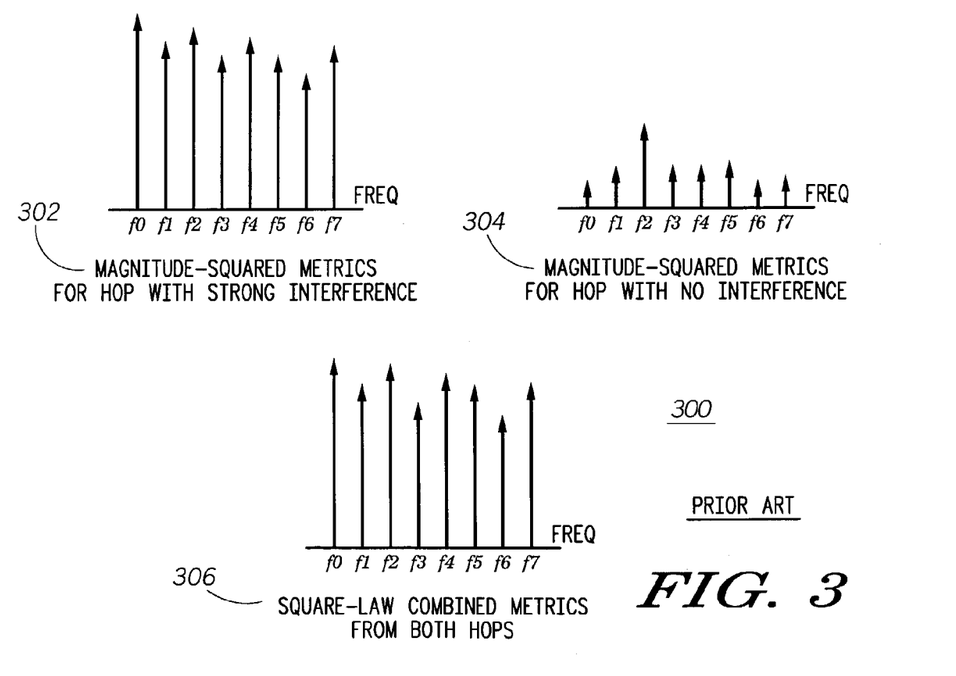
FIG. 3 is an illustration of non-coherent square-law diversity combining for an 8-FSK symbol in a prior art frequency-hopped system, in the presence of strong interference on one of the hops.

Another problem is the mitigation of interference in a system employing soft combining in the receiver, which is of particular importance in the previous frequency-hopping example. This situation is illustrated in FIG. 3 for an exemplary system employing 8-FSK modulation and second-order diversity, demodulated with non-coherent square-law combining. The demodulation is performed with a matched-filter bank, one filter for each of the 8 frequencies. A strong interference process corrupts the matched-filter metrics from the first hop 302. Those from the second hop 304 contain a relatively strong signal component, although the power in that signal is significantly lower than the interference power on the first hop 302. Thus, when the metrics are square-law combined, the interference process overwhelms the resulting set of metrics 306, and there is essentially no signal component.

SUMMARY OF THE INVENTION

Briefly, in accordance with preferred embodiments of the present invention, disclosed are a system, method, wireless device, and computer readable medium for receiving a set of soft metrics associated with a block of symbols during a predetermined time interval, using the set of soft metrics to form an initial interference power estimate, forming a moving-average estimate of interference power corresponding to each predetermined time interval, and scaling the set of soft metrics according to the corresponding interference power estimate resulting in a set of scaled metrics. Then, they limit the dynamic range of the set of scaled metrics, linearly quantize the limited metrics, and output the linearly quantized limited metrics to a memory buffer. The size of the memory buffer containing the linearly quantized limited metrics is smaller than the size of a memory buffer required to store the received soft metrics. The linearly quantized limited metrics are then used as input to a decoder.

The initial interference power estimate is formed using a mean-based estimate or a max-based estimate. Scaling the set of soft metrics is performed by dividing each metric in the set of soft metrics by the corresponding interference power estimate obtained in the predetermined time interval.

The preferred embodiments of the present invention are advantageous because they improve the immunity against interfering signals without significantly degrading the bit-error-rate performance of the wireless device under additive white Gaussian noise (AWGN) conditions. They also provide an efficient method for representing the metrics associated with a block of symbols by limiting the dynamic range of the set of metrics. This allows for a much smaller amount of memory required for storing the metrics, thereby effectively decreasing the cost and/or complexity of the wireless device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including"and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by inversely scaling the soft metrics associated with a block of symbols at a receiver, along with an estimate of the noise/interference level, and then limiting and quantizing them. The benefits of this invention are two-fold: it allows for the efficient storage of the soft metrics, and also provides inherent robustness to interference in certain scenarios, such as frequency hopping.

In a digital communication system that employs soft decisions and block processing of symbols, such as the convolutionally encoded system in FIG. 1 and the frequency-hopped system in FIG. 2, the amount of storage required for the demodulation/decoding process can be prohibitively large. A preferred embodiment of the present invention provides a method for efficiently storing the incoming metrics at the front end of the receiver, with a minimal loss in link performance. This process also provides inherent robustness to interference in some scenarios, such as the frequency-hopped scenario in FIG. 3.

Figure 4:
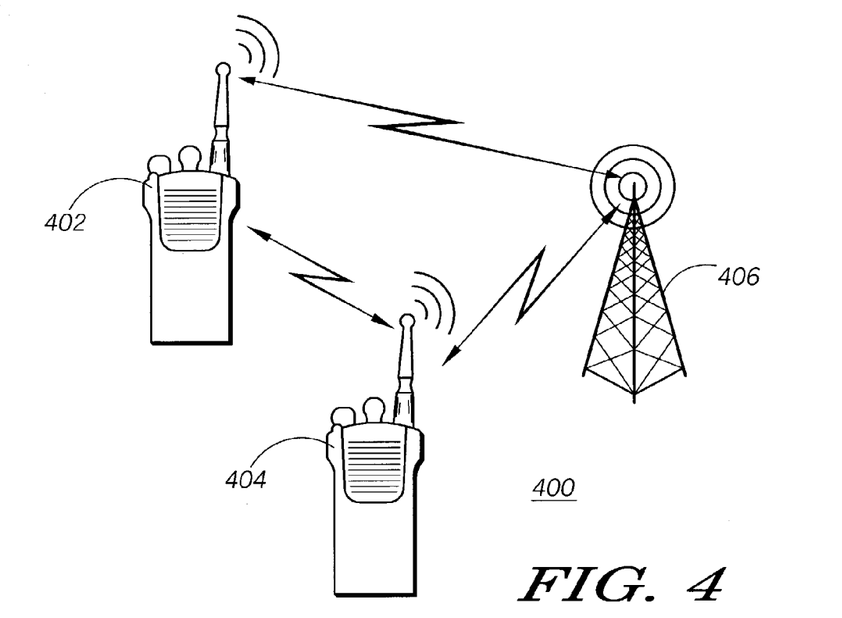
FIG. 4 is a block diagram illustrating a communications system incorporating improved interference estimation and scaling for efficient metric storage and interference immunity, according to a preferred embodiment of the present invention

A physical configuration 400 of users of two wireless devices used by an exemplary embodiment of the present invention is illustrated in FIG. 4. The physical configuration 400 includes two users who each have a wireless device, wireless device A 402 and wireless device B 404. The two users use these wireless devices to communicate with each other, or with other users (not shown). Although two users are shown in this example to improve clarity of explanation, it is to be understood that the features of these embodiments also operate in environments with multiple users. The wireless devices may communicate with each other directly, or may communicate via a relay system such as a cellular base station 406.

Figure 5:
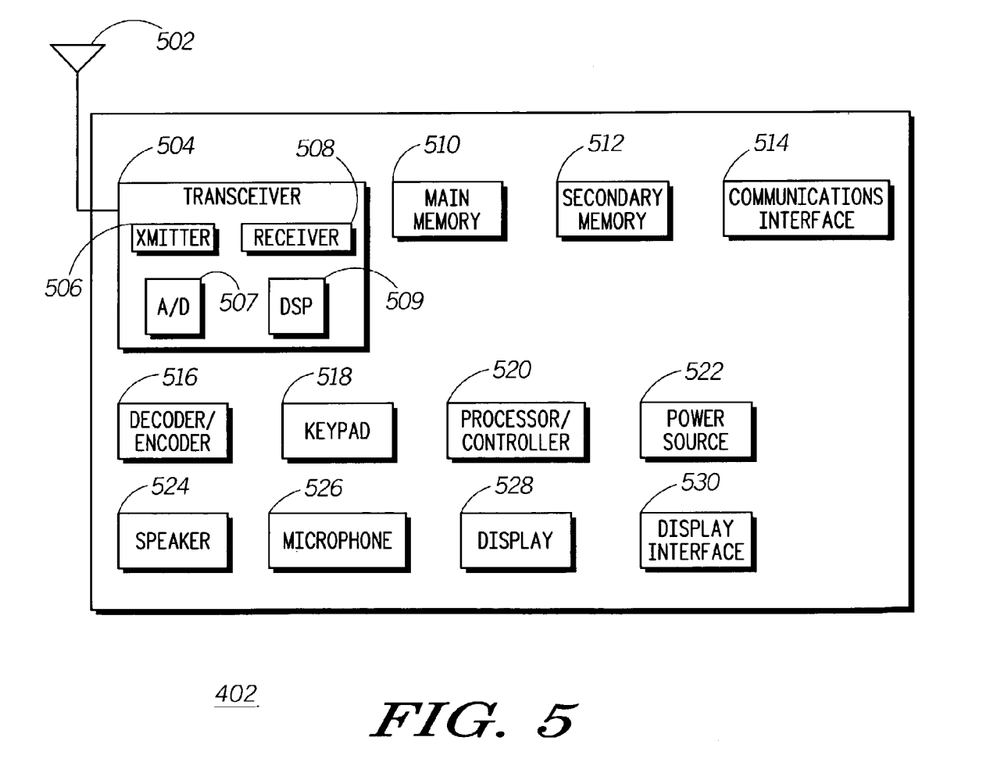
FIG. 5 is a more detailed block diagram illustrating a mobile communication device of the system of FIG. 4, according to a preferred embodiment of the present invention.

A block diagram of an exemplary mobile subscriber device 402 is shown in FIG. 5. The wireless device 402 contains an antenna 502; at least one transceiver 504, having a transmitter 506, a receiver 508, an analog-to-digital converter (A/D) 507, and a digital signal processor (DSP) 509; and a decoder/encoder 516 designed to transmit, receive, encode and decode wireless signals for the frequencies and characteristics of its corresponding system.

Figure 6:
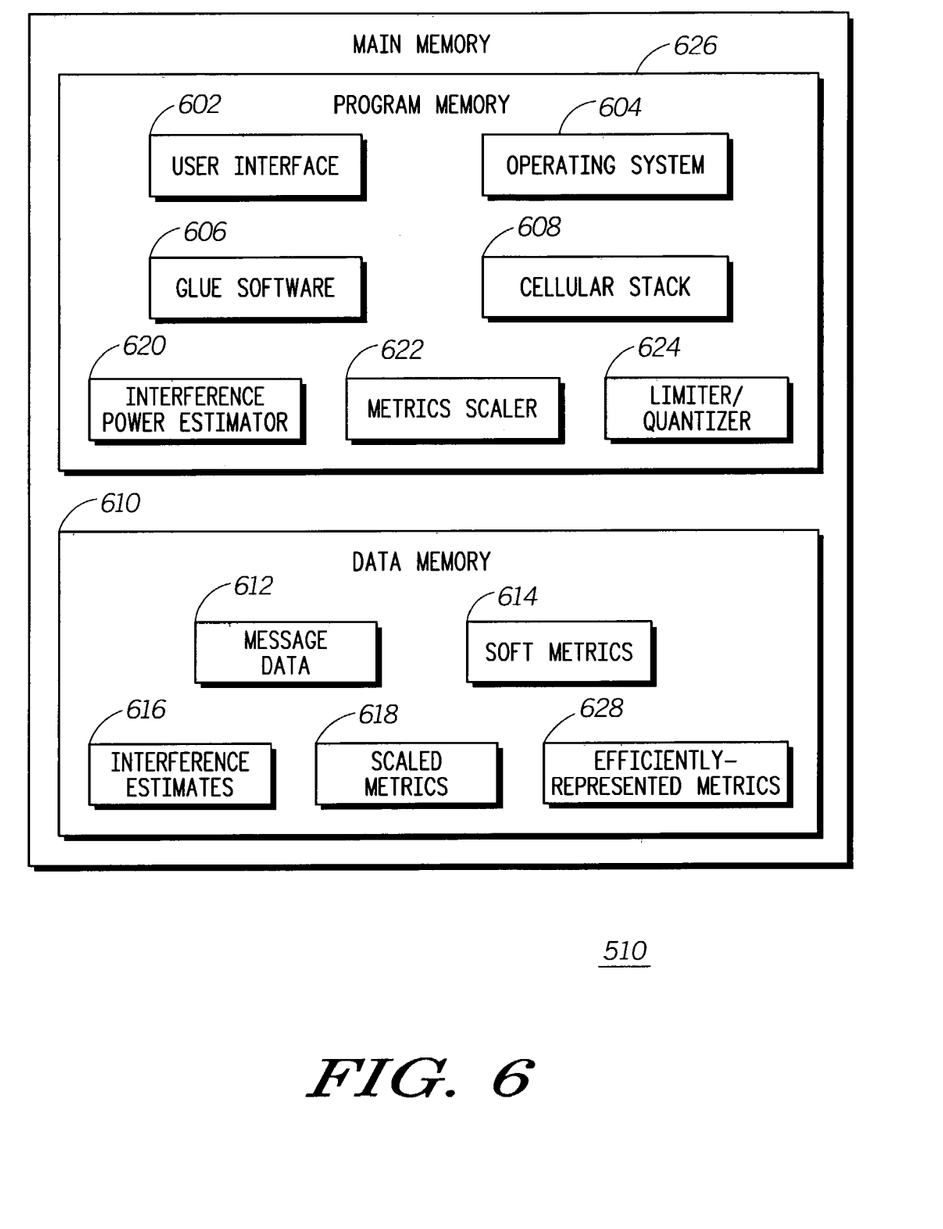
FIG. 6 is a block diagram illustrating the contents of an exemplary main memory of a mobile communication device of the system of FIG. 4, according to a preferred embodiment of the present invention.

The mobile subscriber unit 402 also includes one or more processor/controllers 520, which processes instructions, performs calculations, and manages the flow of information through the wireless device 402. The wireless device 402 also includes a main memory 510 containing a program memory 626 and a data memory 610 (shown in more detail in FIG. 6), preferably random access memory (RAM), and may also include a secondary memory 512. Additionally, the processor 520 is communicatively coupled with the main memory 510. Included within the main memory 510, shown in more detail in FIG. 6, are a user interface 602, operating system platform 604, a cellular stack 608 and glue software 606. The operating system platform 604 manages resources, such as the message data 612 stored in data memory 610, the scheduling of tasks, and processes the operation of the cellular stack 608 in the program memory 626.

The operating system platform 604 also manages a graphical and/or character-based display interface 530 that, according to the present example, controls a display screen 528. Information is displayed to a user of the wireless device 402 via the screen 528, for visual output of information, and a speaker 524, for audible output. A user input interface comprises a keypad 518 and a microphone 526 for receiving input from a user of the wireless device 402. Additionally, the operating system platform 604 also manages many other basic tasks of the wireless device 402 in a manner well known to those of ordinary skill in the art.

Glue software 606 may include drivers, stacks, and low-level application programming interfaces (API's) and provides basic functional components for use by the operating system platform 604 and by compatible applications that run on the operating system platform 604 for managing communications with resources and processes in the wireless device 402.

Other elements stored in the main memory 510 include a buffer containing soft metrics 614 received from an incoming signal, an interference power estimator 620 for determining interference estimates 616 for the corresponding soft metrics 614, a metrics scaler 622 for providing a set of scaled metrics 618 and limiter/quantizer 624 to provide a final set of efficiently-represented metrics 628. These elements will be explained in more detail in later discussion.

The exemplary wireless device 402 also contains a power source 522 for powering the wireless device 402, such as a battery, DC adapter, or AC adapter.

In alternative embodiments, the secondary memory 512 may include other similar means for allowing computer programs or other instructions to be loaded into the wireless device 402. Such means may include, for example, a removable storage unit and an interface (not shown). Examples of such may include a program cartridge and cartridge interface (such as that found in video game devices), a removable memory chip (such as an EPROM, or PROM) and associated socket, and other removable storage units and interfaces that allow software and data to be transferred from the removable storage unit to the wireless device 402.

In this document, the terms "computer program medium," "computer-usable medium," "machine-readable medium" and "computer-readable medium" are used to generally refer to media such as main memory 510 and secondary memory 512, removable storage drive, a hard disk installed in a hard disk drive, and signals. These computer program products are means for providing software to the wireless device 402. The computer-readable medium allows the wireless device 402 to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allows a computer to read such computer-readable information.

Various software embodiments are described in terms of this exemplary system. After reading this description, it will become apparent to a person of ordinary skill in the relevant art(s) how to implement the invention using other computer systems and/or computer architectures.

Figure 7:
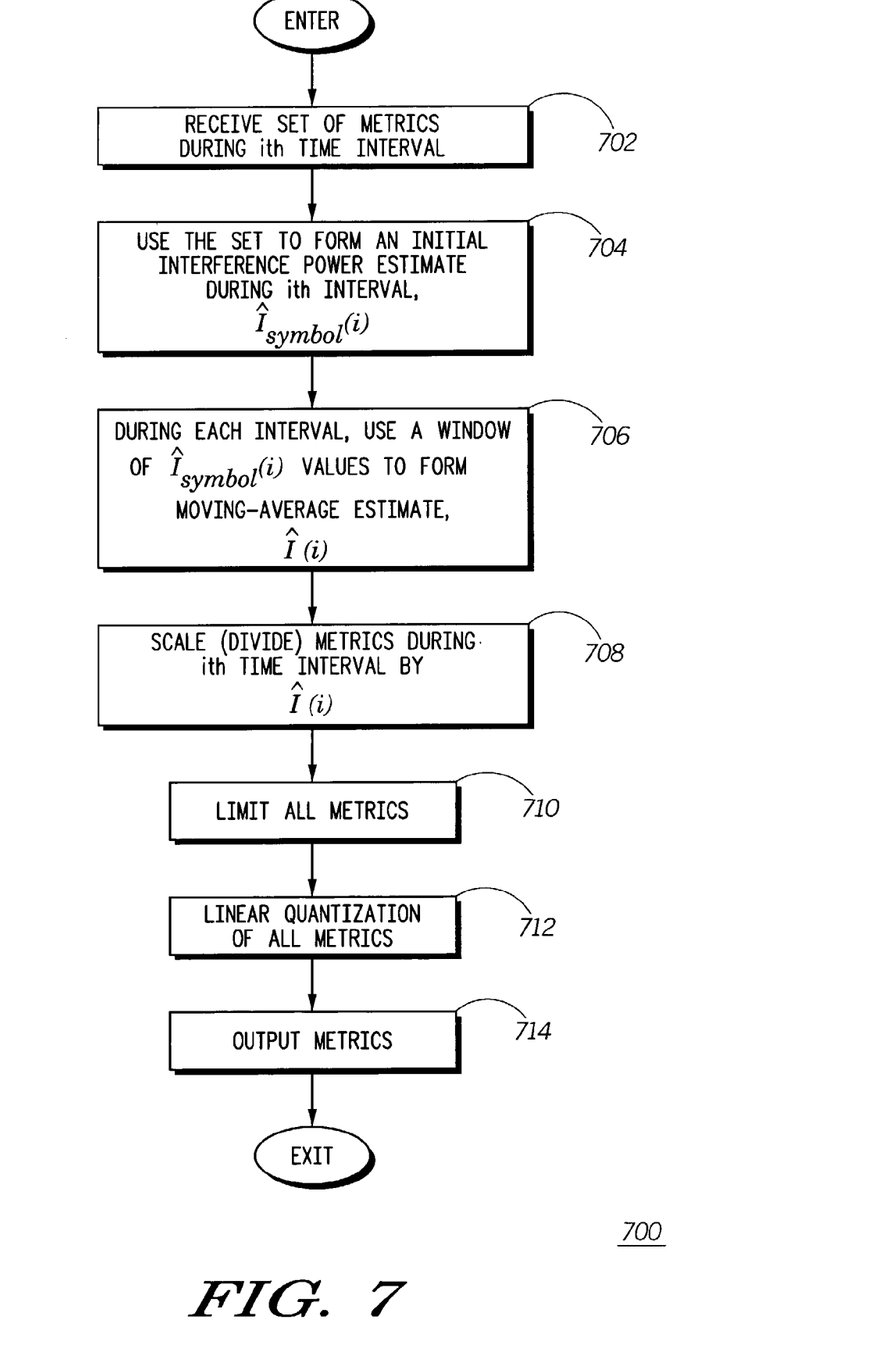
FIG. 7 is an operational flow diagram illustrating portions of an interference estimation and scaling process, according to a preferred embodiment of the present invention.
Figure 8:
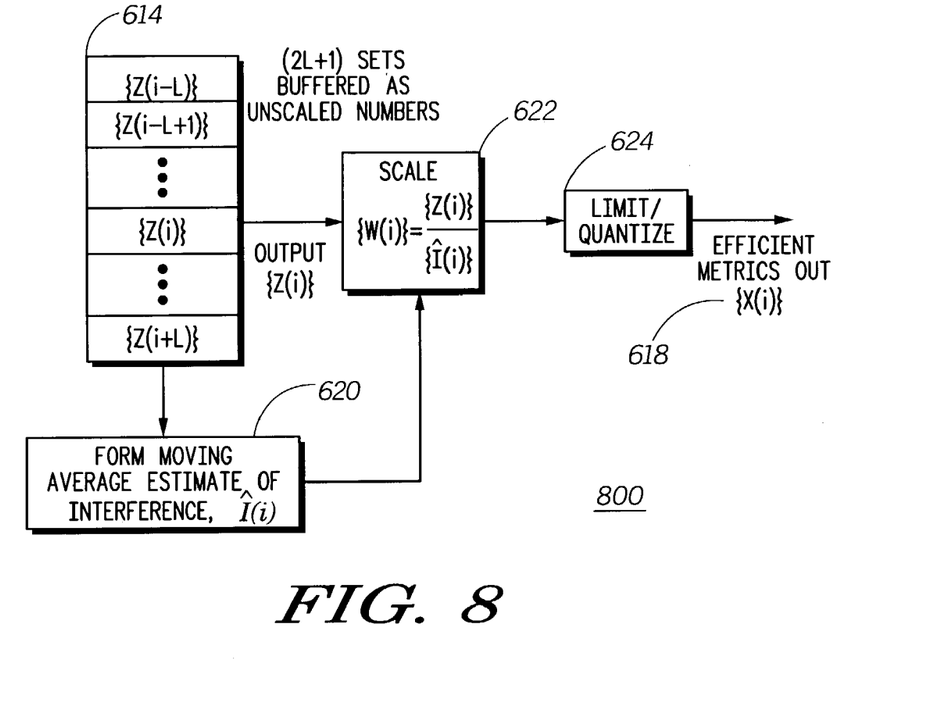
FIG. 8 is a block diagram illustrating an exemplary scaling, limiting, and quantizing process of the mobile communication device of the system of FIG. 4, according to a preferred embodiment of the present invention.

An exemplary operational flow diagram and general formation of the procedure is shown in FIGS. 7 and 8. The procedure begins, at step 702, by receiving a set of soft metrics 614 during time interval i. The incoming metrics 614 during the ith symbol time are denoted in set notation as $\{Z(i)\}$. The number of metrics in the set depends on the modulation format. In a format such as PSK or QAM, each symbol interval produces a single complex metric, such as the output of a matched-filter. In an M-ary FSK format, each symbol interval produces M complex metrics out of a matched-filter bank, with a filter dedicated to each of the M possible tones. These metrics are stored in a temporary memory buffer spanning 2L+1 symbol intervals, in order that a moving average estimate of the interference power can be formed. (Note: the value of L is arbitrary and is typically determined experimentally. Tradeoffs must be taken into consideration between accuracy (requiring higher values) and time constraints (requiring lower values).) Before scaling is performed on them, the metrics are stored in this temporary buffer in a format dictated by the A/D converter 507 and by a DSP 509, perhaps as a 32-bit word in some DSP's.

Figure 9:
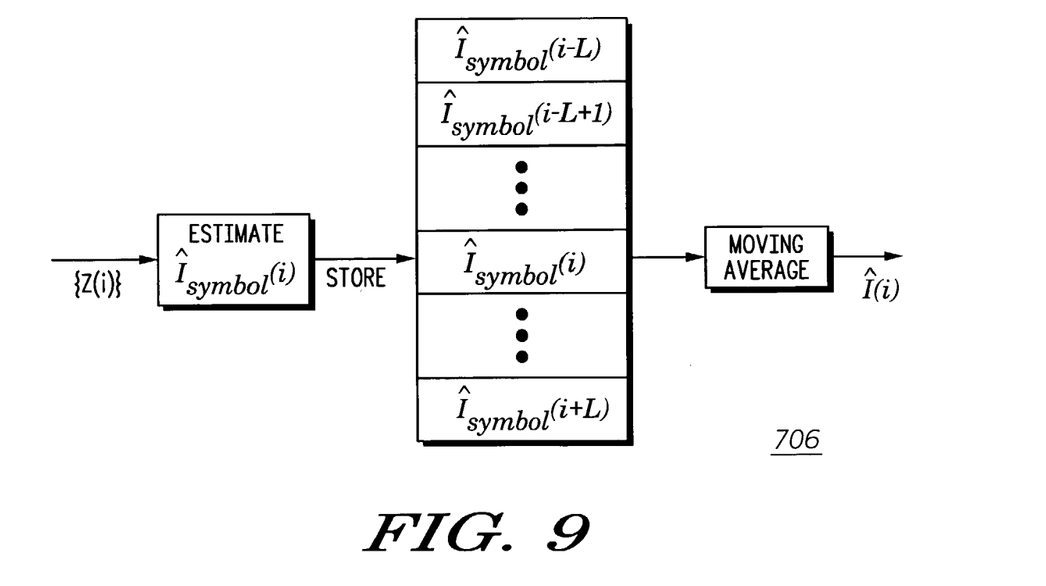
FIG. 9 is a block diagram illustrating an exemplary interference estimation process of the mobile communication device of the system of FIG. 4, according to a preferred embodiment of the present invention.

Next, an estimate of the interference power during the ith symbol time, $\hat{I}(i)$, is formed by the interference power estimator 620. During each symbol interval, a crude estimate of the interference power can be formed, $\hat{I}_{symbol}(i)$, at step 704, by making a preliminary symbol decision, and using the fact that each received statistic consists of signal plus interference or simply interference, depending on the modulation format. Because the average interference power will generally vary slowly with time, the per-symbol interference estimates over a two-sided window of length 2L+1 can then be averaged, at step 706 (illustrated in FIG. 9), to give a more accurate estimate of the interference power $\hat{I}(i)$. A good method of finding $\hat{I}_{symbol}(i)$ depends on the system, and an exemplary method that could be used for a mobile subscriber unit or wireless device, such as the iDEN Talk-Around from Motorola, Inc., will be detailed later as an example. It should be noted that the methods described by this invention could be applied to any communications system that uses diversity combining and, in particular, to systems utilizing non-coherent modulation.

Assume that there are N symbol intervals in the block of interest. The interference estimate during the ith symbol time can be written as $$\hat{I}(i) = \begin{cases} \dfrac{1}{(L+i+1)} \sum_{k=0}^{i+L} \hat{I}_{symbol}(k), & 0 \le i \le L-1 \\ \dfrac{1}{(2L+1)} \sum_{k=i-L}^{i+L} \hat{I}_{symbol}(k), & L \le i \le N-L-1 \\ \dfrac{1}{(L+N-i)} \sum_{k=i-L}^{N-L} \hat{I}_{symbol}(k), & N-L \le i \le N-1 \end{cases} \quad \text{(EQ. 1)}$$

Note that the middle case in (EQ 1) applies to intervals in the middle of the block of N symbols. The first case applies to intervals within the first L of the beginning of the buffer, in which there are no L points available in the window extending back in time. The last case applies to intervals within the last L of the end of the buffer, in which there are no L points available in the window extending forward in time. In these special cases for the intervals near the endpoints, fewer than 2L+1 terms are used, and the estimate is weighted accordingly.

After the estimate of the interference power $\hat{I}(i)$ 616 is formed, the metrics scaler 622 then divides the set of metrics during the ith symbol time, $\{Z(i)\}$ 614 by $\hat{I}(i)$ 616, at step 708, to give the scaled set of metrics $\{W(i)\}$ 618. The limiter/quantizer 624 then performs a limiting/quantizing procedure, at steps 710 and 712, to give the efficiently-represented set of metrics $\{X(i)\}$ 628, which is written out to a memory buffer for input into the demodulation/decoding procedure.

To illustrate a preferred embodiment of the present invention in more detail, and also to demonstrate its benefits, the use of the scaling/limiting/quantizing procedure in Motorola's iDEN Talk-Around will be described. Talk-Around uses 8-FSK modulation, with non-coherent demodulation, and frequency-hopping. The frequency-hopping is exploited in order to give diversity to the system, with the 8-FSK symbols repeated on either two or three hops, depending on their importance to audio quality, as specified in the Voice Channel Procedure (VCP). Talk-Around also uses forward error correction (FEC), with time interleaving. Referring back to the examples outlined in FIGS. 1 and 2, Talk-Around should benefit greatly from the efficient storage of metrics. Also, Talk-Around operates in the unlicensed Industrial, Scientific, and Medical (ISM) band, and thus could be vulnerable to interference. The inherent interference rejection capability of this invention is therefore beneficial as well.

The first step is to determine how to estimate $\hat{I}_{symbol}(i)$ specifically in Talk-Around. Consider an 8-FSK system operating in a Rayleigh fading channel, in the presence of white Gaussian noise with spectral height of $N_0/2$. The received complex decision statistics out of the matched filter bank during the ith symbol time are given as $$Y_k(i) = \begin{cases} \gamma(i) + N_k(i), \omega(i) = \omega(k) \\ N_k(i), \omega(i) \neq \omega(k) \end{cases} \quad \text{(EQ. 2)}$$

and the magnitude-squared values will be used in the non-coherent demodulation/decoding process, $$Z_k(i) = |Y_{k(i)}|^2 = \begin{cases} |\gamma(i) + N_k(i)|^2, \omega(i) = \omega_k \\ |N_k(i)|^2, \omega(i) \neq \omega_k \end{cases}, k = 0, 1, \ldots, 7 \quad \text{(EQ. 3)}$$

In these equations, the fading process $\gamma(i)$ is a zero-mean complex Gaussian random variable with the real and imaginary parts each having a variance of 0.5. The magnitude of $\gamma(i)$ has a Rayleigh distribution, and the average power $E[|\gamma(i)|^2]$ is unity. Also, the noise $N_k(i)$ is a zero-mean Gaussian random variable with the real and imaginary parts independent and each having a variance of $\sigma^2=(2E_s/N_0)^{-1}$, with $E_s$ the average energy-per-symbol. The $N_k(i)$ are also independent for different values of i and for different values of k.

From (EQ 3), 7 of the 8 $Z_k(i)$ consist of noise while one of them consists of signal plus noise. If the metric with highest magnitude is declared the signal for now, then the remaining 7 metrics are assumed to be noise only. A logical method for estimating $\hat{I}_{symbol}(i)$, therefore, is to form a mean-based estimate as $$I_{symbol,mean}(i) = \frac{1}{7} \sum_{\substack{k=0 \\ Z_k(i) \neq \max}}^{7} Z_k(i) \quad \text{(EQ. 4)}$$

This estimate for $\hat{I}_{symbol}(i)$ is then used in (EQ. 1) to give $\hat{I}(i)$, which is used to obtain the scaled set of metrics $\{W(i)\}=\{Z(i)\}/\hat{I}(i)$. It can be shown that the power in the scaled set of metrics $\{W(i)\}$ is $$E_{NOISE}[\{W(i)\}] = \begin{cases} \frac{|\gamma(i)|^2}{2\sigma^2} + 1, \omega(i) = \omega_k \\ 1, \omega(i) \neq \omega(k) \end{cases}, k = 0, 1, \ldots, 7 \quad \text{(EQ. 5)}$$

Thus 7 of the 8 $\{W(i)\}$ consist of noise with a total power of 1.0, and one of the $\{W(i)\}$ consists of noise with a total power of 1.0 plus a signal term $|\gamma(i)|^2/2\sigma^2$. The set of metrics $\{W(i)\}$ now is concentrated at a range near 1.0.

The scaled set of metrics now has a relatively fixed dynamic range, which makes the task of limiting/quantizing straightforward. In systems using soft-decision decoding, there is generally a threshold at which any signal values above it can be clipped and performance will not be degraded. Basically, at some point the signal is strong enough so that few errors, if any, will be made, and still would not be if the signal level were lowered. That level must be found experimentally. Also, because the $\{W(i)\}$ represent magnitude-squared quantities, they cannot be below zero, and therefore no clipping is required at the low end of the range. If they are clipped for any value above a threshold T, then the range of values that must be covered by the quantization process is now a finite range $0 \leq \{W(i) \leq T\}$.

The final step in this part of the efficient storage method is to quantize that range in linear steps. It is obviously desirable to use the smallest number of levels as possible, therefore requiring fewer bits to represent them. The number of levels required in order that the performance not be degraded is also something that must be found experimentally.

The use of the mean-based estimate, just described, helps to demonstrate the idea behind this invention, but other procedures may be desirable for estimating $\hat{I}_{symbol}(i)$. Once the maximum of the $Z_k(i)$ has been chosen, another method for estimating $\hat{I}_{symbol}(i)$ could be to take the maximum of the remaining 7 metrics, which are assumed to contain only noise. The max-based estimate has $$\hat{I}_{symbol,2nd-max}(i) = 2\text{nd}-\max\{Z_k(i)\} \quad \text{(EQ.6)}$$

The effects with this estimator will be similar to those seen when the mean-based method was used. For instance, the power of the scaled set of metrics $\{W(i)\}$ will be within a relatively limited range as was seen in (EQ 5) for the mean-based estimate, but simply a different range. In situations in which there is a narrowband interferer present, or when there is another similar signal transmitted geographically nearby, the max-based estimate could perform better.

For most systems utilizing coherent diversity combining, maximal-ratio combining (MRC) procedure is inherently the optimum method. This method requires that the signal power on each diversity branch is estimated, and then the metrics on that branch are weighted by that value. When the channel associated with a diversity branch is in a deep fade, the contribution from that branch to the combined metric is lowered because the signal power on that branch is low. Likewise, the branches with strong signals will be weighted more heavily and will contribute more to the combined metric.

A preferred embodiment of the present invention may be most beneficial to systems using non-coherent demodulation. The preferred exemplary method differs from the MRC in that the metrics on each branch are scaled inversely by the interference power, and the signal power is not used. The branches that experience strong interference will be weighted lower than those branches not experiencing strong interference. However, in a scenario in which two branches do not experience strong interference, but one has a higher signal level than the other, the branch with the better signal is not weighted more heavily.

To demonstrate the benefits of this invention, consider that in the Voice Channel Procedure (VCP) for iDEN Talk-Around, each 270 ms VCP frame, when magnitude-squared diversity combining is performed, will have 126 Class I symbols to be input to a rate ⅓ Viterbi decoder, 98 Class II symbols to be input to a rate ⅔ Viterbi decoder, and 96 uncoded Class III symbols to be demodulated. Thus there are 320 symbols whose metrics must be stored. For each symbol, there are 8 metrics, since the modulation is 8-FSK. Assume each of the unscaled magnitude-squared metrics in (EQ 3) requires a 32-bit word, or two 16-bit words of memory. The total memory required then before any demodulation/decoding can even be performed is (320 symbols)(8 metrics/symbol)(2 words/metric)=5120 words (EQ. 7) or 5K. If double-buffering is used, then the requirement is 10K.

In contrast, consider the case when a preferred scaling/limiting/quantizing embodiment of the present invention is used with the max-based estimate of interference, with L=10 points per side in the moving average. The scaled metrics are limited to a threshold of 8.0, and quantized to 6 bits, so that a step size is 0.125. They are then stored as 8-bit metrics, instead of 32. Thus the memory requirement is reduced by a factor of 4, to 1.25 K or 2.5 when double-buffered.

It would be expected that the use of scaled metrics should degrade the bit-error rate (BER) performance somewhat. However, this degradation is small and there is a substantial amount of robustness to interference gained from the implementation of a preferred embodiment of this invention.

Figure 10:
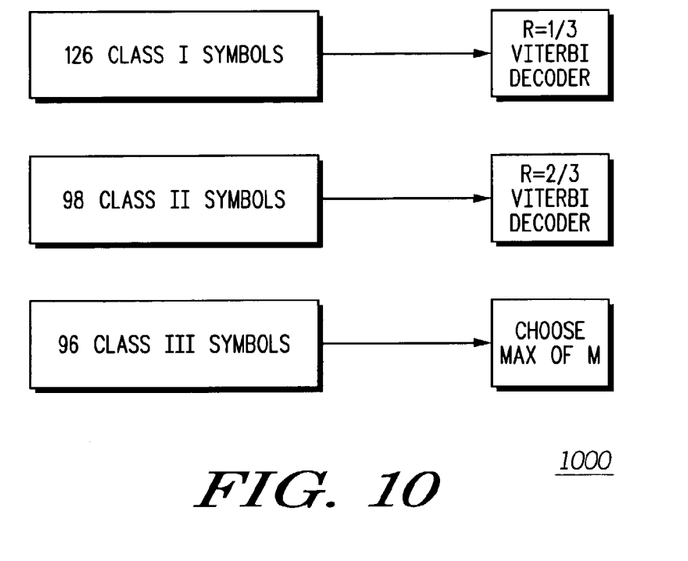
FIG. 10 is an illustration depicting exemplary memory requirements of the mobile communication device of the system of FIG. 4, according to a preferred embodiment of the present invention.
Figure 11:
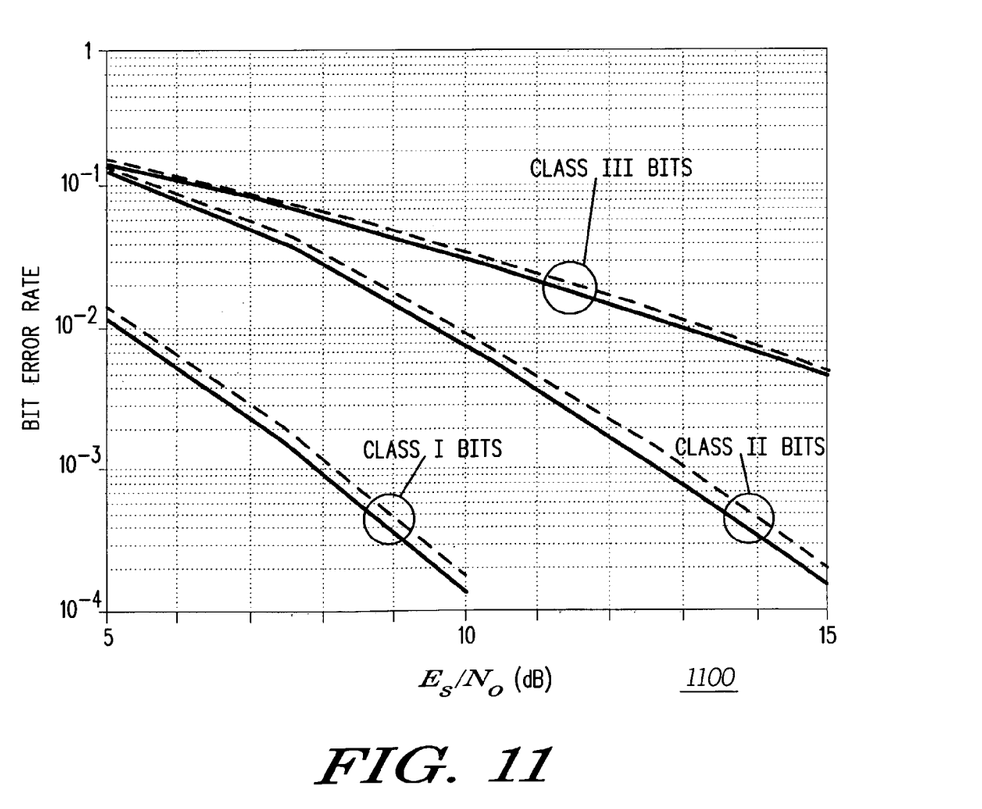
FIGS. 11–15 are exemplary bit-error rate (BER) graphs of the mobile communication device of the system of FIG. 4, according to a preferred embodiment of the present invention.

The VCP for iDEN Talk-Around defines three classes of vocoder bits, in terms of importance to audio quality. Each receives a different amount of forward error correction (FEC)/diversity, as seen in FIG. 10. In FIG. 11, the bit error rates are shown for all three classes of bits, with the case in which scaled/limited/quantized metrics are used illustrated as a dashed line. The bit error rates are also shown for the case when no scaling/limiting/quantizing is used, for comparison. Note that there is only about 0.2–0.3 dB of degradation as a result of the scaling/limiting/quantizing.

Figure 12:
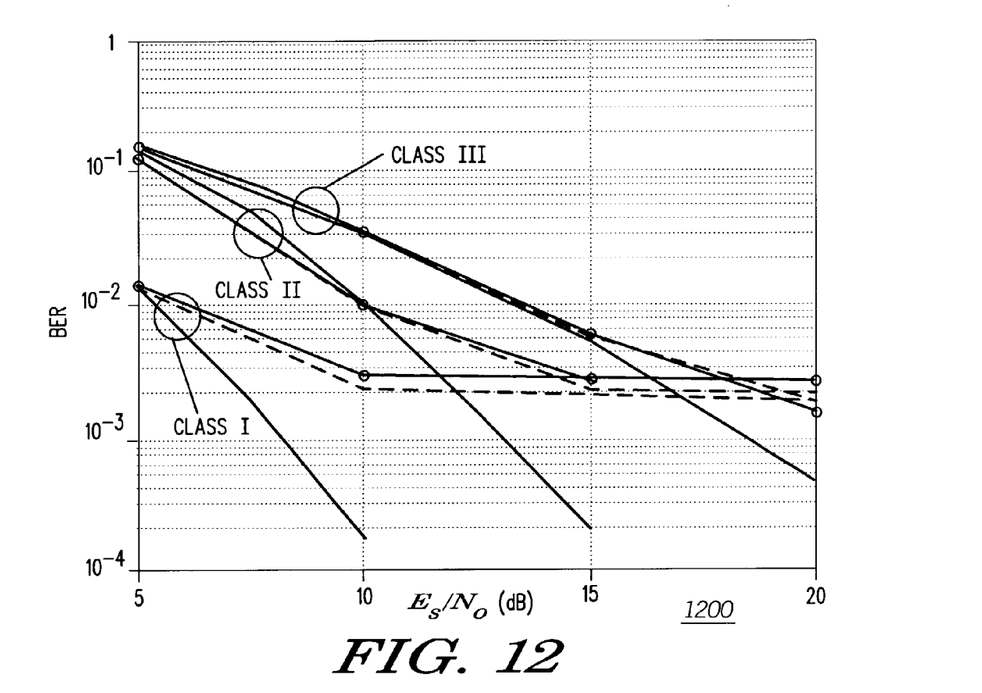
Figure 13:
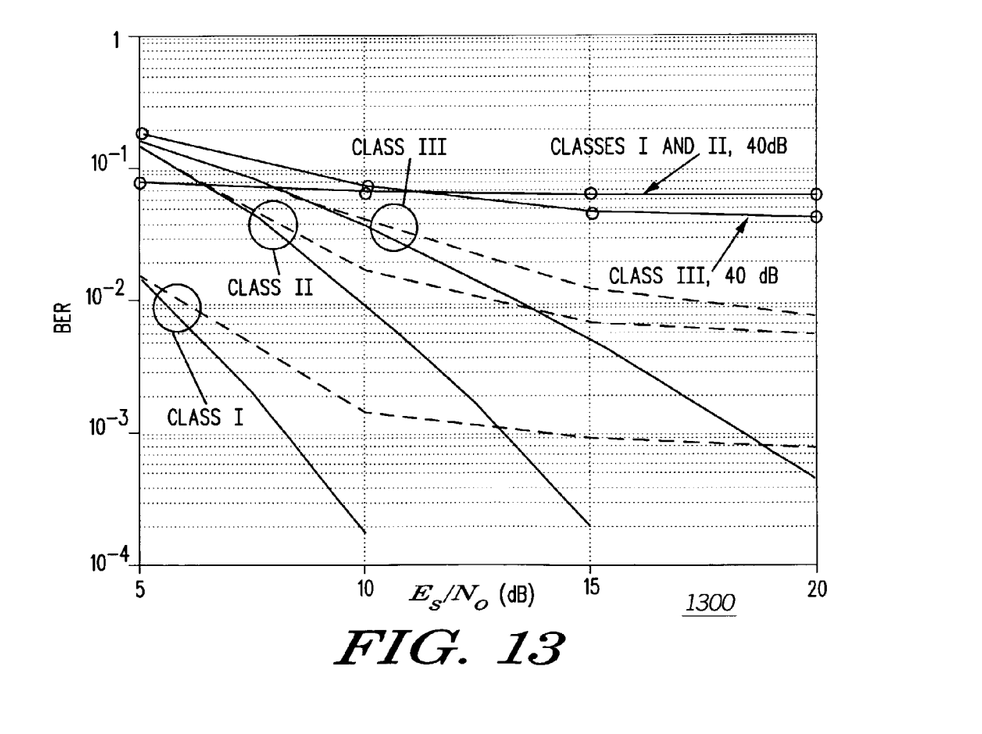

As shown in the example in FIG. 3, the presence of strong interference on one of the hops can potentially dominate the combined metric. In the bit-error rate results in FIG. 12, a single narrowband interferer with bandwidth 50 kHz is present, at a near-far ratio of either 20 or 40 dB with respect to the power in the received signal. In FIG. 13, a similar curve is shown for a wideband interferer of bandwidth 1.25 MHz. The degradation experienced in both cases is obviously severe, with floors at unacceptably high error rates. The interferers in both cases make the wireless communications system virtually inoperable.

Figure 14:
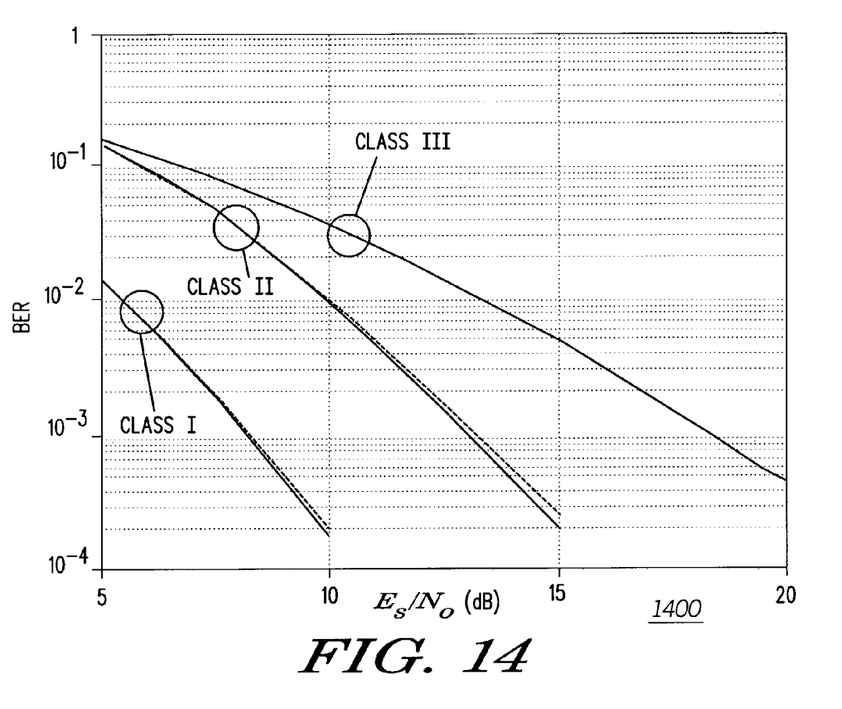
Figure 15:
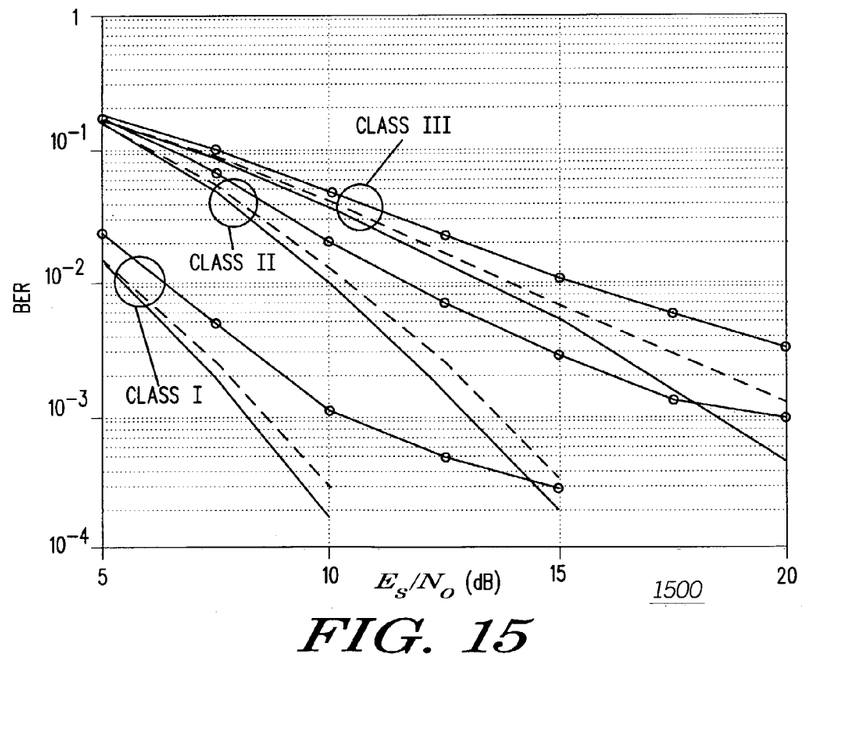

Now, results in FIG. 14 show the benefits of a preferred scaling/limiting/quantizing embodiment of the present invention for the system with narrowband interference. The effects of the interference are almost completely suppressed, even when received at a near-far ratio of 40 dB. In FIG. 15, results are shown for the system operating in the presence of wideband interference. The system experiences less than 1 dB of degradation at most points in the figure when the near-far ratio is 20 dB. When the near-far ratio is increased to 40 dB, the degradation increases, but the performance is improved tremendously when compared to the situation in FIG. 13, in which an error floor at about 5% BER was experienced.

The present invention can be realized in hardware, software, or a combination of hardware and software. An embodiment of the present invention can also be embedded in a computer program product, which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Computer programs (also called computer control logic) are stored in main memory 510 and/or secondary memory 512. Computer programs may also be received "over-the-air" via one or more wireless receivers. Such computer programs, when executed, enable the wireless device 402 to perform the features of the present invention as discussed herein. In particular, the computer programs, when executed, enable the processor 520 to perform the features of the wireless device 402. Accordingly, such computer programs represent controllers of the wireless device 402.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments.

Furthermore, it is intended that the appended claims cover any and all such applications, modifications, and embodiments within the scope of the present invention.

What is claimed is:

1. A method comprising:
   receiving a set of soft metrics associated with a block of symbols, each soft metric having been received during a predetermined time interval;
   using the set of soft metrics to form an initial interference power estimate;
   forming a moving-average estimate of interference power corresponding to each predetermined time interval;
   scaling the set of soft metrics according to the corresponding interference power estimate resulting in a set of scaled metrics;
   limiting a dynamic range of the set of scaled metrics;
   linearly quantizing the limited metrics; and
   outputting the linearly quantized limited metrics to a memory buffer.

2. The method of claim 1, wherein the initial interference power estimate is formed using a mean-based estimate.

3. The method of claim 1, wherein the initial interference power estimate is formed using a max-based estimate.

4. The method of claim 1, wherein the scaling the set of soft metrics step comprises dividing each metric in the set of soft metrics by the corresponding interference power estimate obtained in the predetermined time interval.

5. The method of claim 1, further comprising:
   using the linearly quantized limited metrics as input to a decoder.

6. The method of claim 1, wherein a size of the linearly quantized limited metrics as outputted to the memory buffer is smaller than a size of the received soft metrics as stored in the memory.

7. A wireless device comprising:
at least one transmitter for transmitting data signals;
at least one receiver for receiving a set of soft metrics associated with a block of symbols, each soft metric having been received during a predetermined time interval, using the set of soft metrics to form an initial interference power estimate, forming a moving-average estimate of interference power corresponding to each predetermined time interval, and scaling the set of soft metrics according to the corresponding interference power estimate resulting in a set of scaled metrics;
a decoder/encoder, communicatively coupled to the at least one receiver and the at least one transmitter, for decoding and encoding data signals;
a processor/controller, communicatively coupled to the decoder/encoder, for processing signals of the at least one wireless device; and
a memory buffer, wherein the wireless device limits a dynamic range of the set of scaled metrics, linearly quantizes the limited metrics and outputs the linearly quantized limited metrics to the memory buffer.

8. A communication system comprising:
a wireless network comprising at least one cell; and
at least one wireless device for wireless communication with the at least one cell, the at least one wireless device comprising:
   at least one transmitter for transmitting data signals;
   at least one receiver for receiving a set of soft metrics associated with a block of symbols, each soft metric having been received during a predetermined time interval, using the set of soft metrics to form an initial interference power estimate, forming a moving-average estimate of interference power corresponding to each predetermined time interval, and scaling the set of soft metrics according to the corresponding interference power estimate resulting in a set of scaled metrics;
   a decoder/encoder, communicatively coupled to the at least one receiver and the at least one transmitter, for decoding and encoding data signals; and
   a processor/controller, communicatively coupled to the decoder/encoder, for processing signals of the at least one wireless device; and
   a memory buffer, wherein the wireless device limits a dynamic range of the set of scaled metrics, linearly quantizes the limited metrics and outputs the linearly quantized limited metrics to the memory buffer.

9. A communications system comprising:
at least two wireless devices for wireless communication with each other, the at least two wireless devices each comprising:
   at least one transmitter for transmitting data signals;
   at least one receiver for receiving a set of soft metrics associated with a block of symbols, each soft metric having been received during a predetermined time interval, using the set of soft metrics to form an initial interference power estimate, forming a moving-average estimate of interference power corresponding to each predetermined time interval, and scaling the set of soft metrics according to the corresponding interference power estimate resulting in a set of scaled metrics;
   a decoder/encoder, communicatively coupled to the at least one receiver and the at least one transmitter, for decoding and encoding data signals; and
   a processor/controller, communicatively coupled to the decoder/encoder, for processing signals of the at least one wireless device; and
   a memory buffer, wherein each wireless device limits a dynamic range of the set of scaled metrics, linearly quantizes the limited metrics and outputs the linearly quantized limited metrics to the memory buffer.

10. A computer readable medium comprising computer instructions for performing the steps of:
receiving a set of soft metrics associated with a block of symbols, each soft metric having been received during a predetermined time interval;
using the set of soft metrics to form an initial interference power estimate;
forming a moving-average estimate of interference power corresponding to each predetermined time interval;
scaling the set of soft metrics according to the corresponding interference power estimate resulting in a set of scaled metrics;
limiting a dynamic range of the set of scaled metrics;
linearly quantizing the limited metrics; and
outputting the linearly quantized limited metrics to a memory buffer.

11. The computer readable medium of claim 10, wherein the initial interference power estimate is formed using a mean-based estimate.

12. The computer readable medium of claim 10, wherein the initial interference power estimate is formed using a max-based estimate.

13. The computer readable medium of claim 10, wherein the scaling the set of soft metrics step comprises dividing each metric in the set of soft metrics by the corresponding interference power estimate obtained in the predetermined time interval.

14. The computer readable medium of claim 10, further comprising instructions for:
using the linearly quantized limited metrics as input to a decoder.

15. The computer readable medium of claim 10, wherein a size of the linearly quantized limited metrics as outputted to the memory buffer is smaller than a size of the received soft metrics as stored in the memory.

* * * * *